July 23, 1963 L. R. DAY 3,098,617

FLEXIBLE RECORD TRANSPORT APPARATUS

Filed Jan. 14, 1960

INVENTOR.
LESLIE R. DAY
BY J L Knight
ATTORNEY

United States Patent Office 3,098,617
Patented July 23, 1963

3,098,617
FLEXIBLE RECORD TRANSPORT APPARATUS

Leslie R. Day, Old Bridge, N.J., assignor to Monroe Calculating Machine Company, Orange, N.J., a corporation of Delaware Filed Jan. 14, 1960, Ser. No. 2,374
10 Claims. (Cl. 242—55.11)

Figures 1, 2:
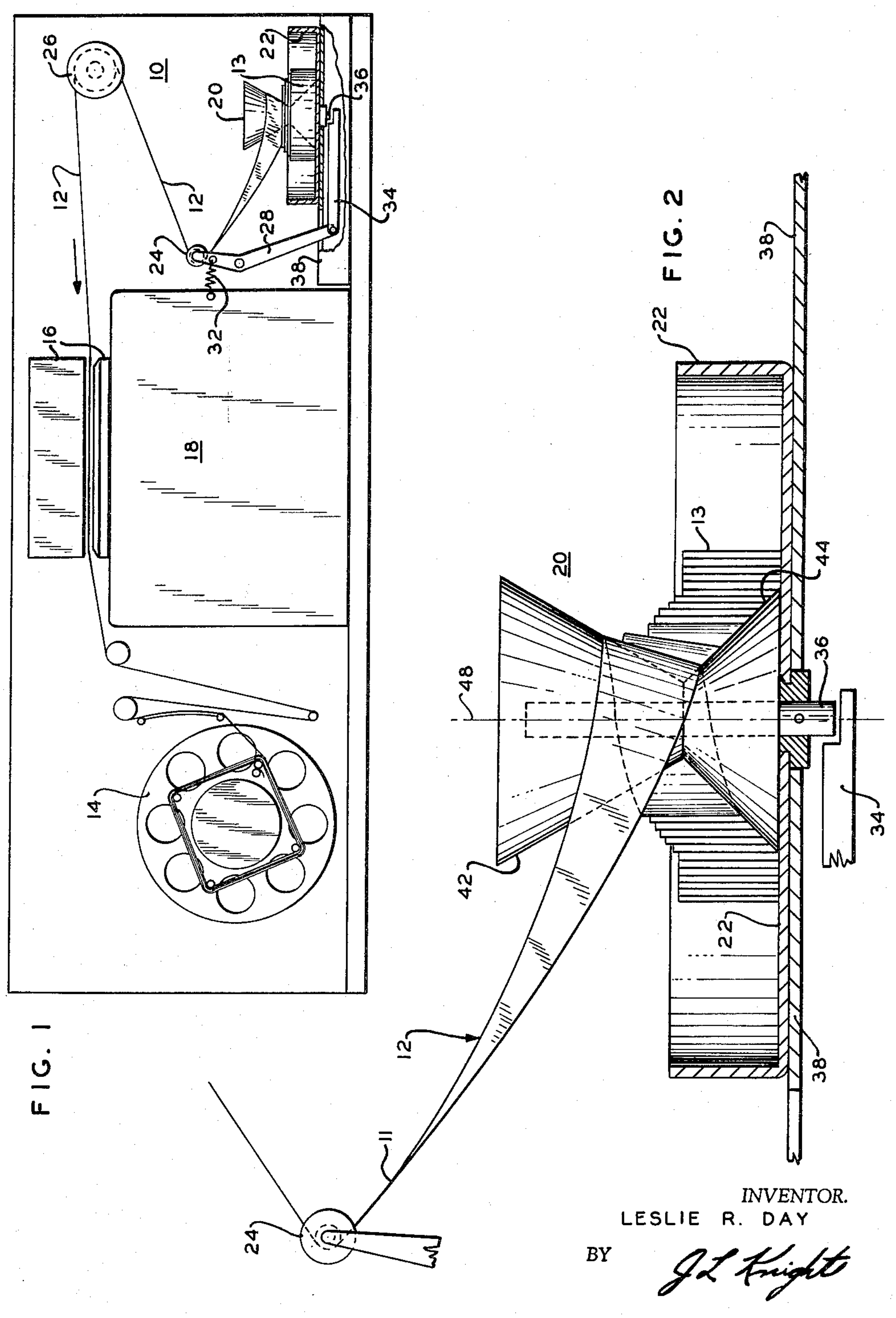

This invention relates to record processing and, more particularly, in an important aspect, to apparatus for transporting a flexible, longitudinally extending, planar record member through information transducing apparatus.

It has been known heretofore to store information for processing on flexible, extended record media. Illustrative of such media are the punched paper tape and the magnetically responsive tape.

It has also been known to wind the initial end of an extended record medium or tape, that is, the end upon which the first or initial portion of a record is established, about a central member. Thereafter, following portions of the record medium are wound about the first wound portions in the fashion of a ribbon on a reel. Advantageously, for reading information so stored, it has further been known to extract the initial portion of a so wound record medium from a centrally wound position and to process information stored thereon in order from the centrally wound initial portion to the exteriorly wound portions of the record media. Thus, the medium, after processing, may be stored in its initial wound condition directly without cumbersome winding in one direction and rewinding in another.

Toward physically extracting the initial portion of such a record medium from a centrally wound position with facility, it has been found advantageous in the prior art to dispose a wound record member about a spindle which is a surface of revolution having a decreasing radius of revolution along the axis of that revolution. In a simple configuration, it has been known to dispose a wound tape about the large cross-section portion of a spindle which has a right circular, conical configuration. The initial portion of the extended record medium or tape which is proximate to the surface of the conical spindle is then withdrawn by appropriate mechanisms in a direction having a component toward the apex of the conical spindle.

To prevent translation of the record media toward the apex of the cone and, thereafter, off the spindle entirely, stopper plates of one form or another have been arranged on such conical spindles toward the conical apex.

Stopper plates have indeed been successful in accomplishing their primary function. They have, however, lain open to two principal objections in operation. First, in limiting the axial positioning of the tape, they have forced a sawing action to take place between the lower edge of one loop of tape and the upper edge of that loop next below. Further, the abrupt axial stoppage imposed upon the record medium by such plates has given rise to discontinuities in the motion of the record medium about the spindle. These motion discontinuities further give rise to tape bunching. This leads to tape seizures and breakages. Such seizures and breakages further have necessitated clutch mechanisms which further complicate the tape unreeling operation.

Accordingly, it is a principal object of the present invention to accomplish a smooth, continuous unreeling of a wound planar record medium for extracting stored information in order from the interiorly wound portions of the medium to the exteriorly wound portions.

It is a further object of the invention to simplify extended record reeling mechanisms, to eliminate the need for protective clutches and the like, and, at the same time, to reduce and maintain uniform the tensions on a wound record medium.

These and other objects are achieved in accordance with the invention by providing a spindle having a complex surface of revolution for receiving a wound, longitudinally extending record medium. The one portion of the spindle, conveniently, the storage portion about which a wound record medium or tape is placed for subsequent take-up and read-out, is inclined in one sense with respect to the axis of revolution and the corresponding element of the other portion, the take-up portion, of the spindle is inclined in an opposite sense. Further the storage portion is inclined to the axis at least as much as, and preferably more than, the take-up portion of the spindle.

The initial portion of the tape, that is the portion centrally disposed most closely to the spindle, is drawn axially toward the take-up portion of the spindle. The tape is tensioned by an appropriate mechanism to pass from the storage portion of the spindle, to the take-up spindle portion, thence to a transducing device.

For purposes of example and by way of illustration, in one embodiment of the invention a spindle is made up of two truncated cone members mounted vertically and rotatably on a common axial member. The minor cross-sections of both these cone members are juxtaposed. The surface of the upper cone member exhibits a lesser slope with respect to the central axial member than does the surface of the lower cone member.

A wound tape member is disposed about the lower of these two conical members and the centrally disposed end of this tape is led upward about both conical members under urging of a conventional driving mechanism which may include a well known sprocket mechanism for feeding the tape to a reading mechanism. In this reading mechanism information stored on the tape in one form is transduced to another for further disposal.

The two spindle members rotate freely with respect to one another and with respect to the central axial member. Thus, inequalities of travel of different portions of the spindle member surfaces with respect to the tape wound thereon are compensated and a substantially uniformly distributed tension is maintained between the tape take-up mechanism and all portions of the tape associated immediately with the spindle.

Thus, in this embodiment of the invention, that portion of the record medium upon which information is first recorded, the initial portion, is similarly first applied to transducing mechanism for transformation of the information stored thereon. At the same time, sawing action between the edges of adjacent loops of the record medium are eliminated and bunching of tape portions wound exteriorly to the initial portion is avoided by the uniformly distributed tension placed upon the record medium.

Accordingly, it is a feature of this invention that a spindle comprises two distinct surfaces of revolution about a common axis.

It is a further feature of the present invention that one of these surfaces, the take-up surface, have an inclination with respect to this axis which is equal to or less than the inclination of the other surface, the storage surface.

It is a further feature of the present invention that the spindle is disposed for free rotation about an axial member.

It is a further feature of the present invention that the storage surface member and the take-up surface member of the spindle are freely rotatable one with respect to another and to the common axial member.

It is a further feature of the present invention that a tensioning mechanism is disposed with respect to the spindle for urging a tape member disposed about the storage portion of the spindle axially toward a take-up portion of that spindle.

Other objects, features and advantages of the invention will become more clear from a consideration of the following detailed description of an illustrative embodiment of the invention taken together with the appended claims and the drawings.

In the drawings:

FIG. 1 is a partially sectioned elevation view of tape recorded signal transducing apparatus embodying principles of the invention; and FIG. 2 is a partially sectioned view illustrating a structural detail of the apparatus of FIG. 1.

Referring now more particularly to the drawings:

In FIG. 1 there is shown data processing apparatus 10 for processing information stored on a planar, longitudinally extending flexible record member 12. This record member is advantageously a magnetically impressionable tape though clearly, in accordance with the invention, it may as well be a punched paper tape or any of the other well-known record media consistent with the character of the associated data processing structure.

As shown, a conventional powered driving reel 14 rotates clockwise to tension the tape 12 and to draw this tape from right to left, as indicated, through transducing head 16. In this transducing head sequential signals are derived from the tape for application to suitable well-known computing elements 18. These elements are arranged and constructed in well-known fashion for processing data signals derived from the tape 12 by the transducing head 16.

The tape is disposed spirally about a spindle 20 and rests in a freely rotatable pan 22, which is mounted, as shown, for concentric rotation with the spindle 20.

An initial portion of the tape, under tensioned urging of the reel 14, passes over pivoted roller member 24, thence to an idler reel 26, for sequential reading of stored information by the transducer 16. The roller member 24 is mounted on a pivoted arm 28. This arm is urged to tension the tape by a spring 32 as shown. Spindle 20 is freely rotatable about an axle member 36 which in turn is fixed to the pan 22. This pan and axle member, in turn, are freely rotatable with respect to the supporting frame member 38, as shown.

Arms 28 and 34 together form a linkage convenient for braking rotation of pan 22. This braking becomes important as tension in the spring 32 fails to be countered by corresponding tension in tape 12 as applied through roller member 24. Thus, should spindle 20, pan 22 and the wound tape acquire substantial rotational velocity, failure of the reel 14 to maintain tension in the tape would result in hopeless unreeling of the tape resting in the pan 22. Such a reduction in tension, however, is countered immediately in the structure of this embodiment of the invention by braking imposed by the spring 32 acting through arms 28 and 34 on the axle member.

Turning now to FIG. 2, there is shown in more detail the structure of the spindle 20, the pan 22 and the roller 24, together with immediately associated mechanisms.

The spindle 20 comprises an upper member 42 and a lower member 44, the two spindle members being concentrically mounted for mutually independent rotation about an axle member 36. This axle member pierces and is fixed to pan 22. This pan, like the upper and lower spindle members 42 and 44, is freely rotatable with respect to frame member 38. The tape 12 may illustratively have been prepared for processing by winding, from an initial portion 11 to a terminal portion 13, about a reel similar to the reel 14 shown in FIG. 1. This tape, so prepared, has been positioned for processing as shown, by removal of the independent upper spindle member 42 from the axle member 36 and by placing the so wound tape about the lower spindle 44.

Thereafter, the initial portion 11 of the tape is drawn axially in circumferentially contacting relation with the lower spindle member 44 and the upper spindle member 42, thence, about the roller 24, as noted heretofore.

The upper and lower spindle members both comprise surfaces of revolution about a common axis 48 passing through the axle member 36. As shown, the two together form the spindle 20 which is in itself a surface of revolution about the axis 48.

Further, as shown, the surfaces of the upper member 42 and of the lower member 44 are inclined in an opposite sense with respect to the common axis 48. Further, the inclination of the lower surface with respect to that axis has, with particular advantage, an inclination which is absolutely greater than the inclination of the upper member 42.

In a limiting case, in other embodiments of the invention it may be that the slopes of the upper and lower spindle members are equal, though such equality requires delicate positioning of the roller 24 in a direction from the pan 22 along the axis 48. In this illustrative embodiment of the invention, the inclination of the take-up spindle member 42 being substantially less than the inclination of the storage spindle member 44 eliminates a need for delicate positioning of the roller 24.

This roller 24, as shown, is positioned axially from the lower spindle member 44 in a direction toward the upper member 42. That is, the member having the lesser slope acts together with the drive reel 14, shown in FIG. 1, to tension the initial portion 11 of the tape 12. Thus, the tape is drawn upwardly in circumferentially contacting relation about both portions of the spindle member 20, i.e., the portions 42 and 44, for processing.

As shown in cross-section, the terminal portion 13 of the tape 12 is spirally disposed about the central lower spindle member 44. By virtue of the greater slope of the latter member with respect to the upper spindle member, these terminal tape portions do not come into edge engagement with the tensioned initial portions of the tape 12. Thus sawing action between the edges of the wound terminal portions of the tape and the tensioned initial portions of the tape is avoided.

Similarly, the arrangements in accordance with the invention preclude uneven tensioning within the wound terminal portions of the tape as the initial tape portion is extracted for processing.

Heretofore, there has been described one illustrative embodiment of the invention. Other variants of this illustrative structure will be apparent to those skilled in the art without departure from the spirit and scope of the invention.

What is claimed is:

1. In apparatus for processing a flexible, longitudinally extending, record member having an initial portion and a terminal portion, the combination which comprises, a rotatable spindle member having a first, storage portion and a second, take-up portion, said spindle portions each having minor cross-sections disposed in adjacent relation and being arranged along a common axis for independent rotation, said spindle portions further having slopes of opposite sense with respect to said axis, the slope of said first spindle portion being at least as great as the slope of said second portion, said first spindle storage portion further being adapted to receive said record member in spirally wound disposition from a central portion to an external portion, said last named portions corresponding, respectively, to said record member initial portion and to said record member terminal portion, and driving means for extracting said record member from said spindle in order from said central portion to said external portion, said driving means being arranged for bringing said record member into circumferential contacting relation with said spindle take-up portion.

2. Data processing apparatus which comprises a rotatable spindle member said spindle member comprising a conical storage portion and a conical take-up portion, said portions being disposed concentrically along a common axis, said portions further having opposite inclinations with respect to said axis, said storage portion having an inclination greater than that of said take-up portion, a flexible, longitudinally extending record medium having information signals stored in longitudinal sequence, said record medium being spirally disposed about said spindle member in circumferentially contacting relation from an initial portion of said medium in contact with said take-up spindle portion to said storage spindle portion thence outwardly from said spindle to a medium transducer means for processing signals imprinted on record medium portions presented thereto, and means for successively presenting portions of said record medium to said transducer means from said take-up spindle portion.

3. In apparatus for processing a flexible, longitudinally extending, record member having an initial portion and a terminal portion, the combination comprising a rotatable spindle member having a storage portion and a take-up portion, said spindle portions each having minor cross-sections disposed in adjacent relation and being arranged along a common axis of rotation and being mounted for independent rotation about said axis, said spindle portions further having slopes of opposite sense with respect to said axis, the slope of said storage portion being at least as great as the slope of said take-up portion, said storage portion further being adapted to receive said record member in spirally wound disposition from a central portion to an external portion, said last named portions corresponding, respectively, to said record member initial portion and to said record member terminal portion, and driving means for extracting said record member from said spindle in order from said central portion to said external portion, said driving means being arranged for bringing said record member into circumferential contacting relation with said spindle take-up portion.

4. In apparatus for processing a flexible, longitudinally extending record member having an initial portion and a terminal portion, the combination comprising a rotatable spindle member having a storage portion and a take-up portion, said spindle take-up portion being mounted in substantially vertical relation above said storage spindle portion, said spindle portions each having minor cross-sections disposed in adjacent relation and being arranged along a common axis of rotation, said spindle portions having slopes of opposite sense with respect to said axis, the slope of said storage portion being at least as great as the slope of said take-up portion, said storage portion being adapted to receive said record member in spirally wound disposition from a central portion to an external portion, said last named portions corresponding, respectively, to said record member initial portion and to said record member terminal portion, a pan member rotatably mounted for independent concentric rotation with said spindle, said pan member being disposed beneath said storage spindle portion for supporting the record member portion subsequent to said initial portion, driving means for extracting said record member from said central portion to said external portion, said driving means being arranged for bringing said record member into circumferential contacting relation with said spindle take-up portion, and braking means associated with said pan member and responsive to stoppages in said driving means for braking said pan member.

5. Apparatus as set forth in claim 4 wherein the said driving means comprises spring loaded roller means for extracting said record member means from said spindle take-up portion under substantially constant tension, and linking means for actuating said braking means in response to a substantial decrease in force applied to said spring loaded roller means by said record medium.

6. Flexible record transport apparatus comprising a frame member, an axle member associated with and supported by the frame member, a spindle having a storage portion and a take-up portion, said spindle portions being mounted for independent rotation about the common axis of the axle member, the said portions having slopes of opposite sense with respect to said axis so as to form truncated cones of abutting minor cross-sections.

7. Apparatus as set forth in claim 6 wherein said take-up portion is mounted in substantially vertical relation above said storage portion and, a pan member rotatably mounted for independent concentric rotation with said spindle, said pan member being disposed beneath said storage portion for supporting the record member.

8. In apparatus for processing a flexible, longitudinally extending, record member having an initial portion and a terminal portion, the combiantion which comprises, a rotatable spindle member having a first, storage portion and a second, take-up portion, said spindle portions each having minor cross-sections disposed in adjacent relation and being arranged along a common axis of rotation, said spindle portions further having slopes of opposite sense with respect to said axis, the slope of said first spindle portion being at least as great as the slope of said second portion, said first spindle portion further being adapted to receive said record member in spirally wound disposition from a central portion to an external portion, said last named portions corresponding, respectively, to said record member initial portion and to said record member terminal portion, the said spindle take-up portion being mounted in substantially vertical relation above said storage spindle portion and, in combination therewith, a pan member rotatably mounted for independent concentric rotation with said spindle, said pan member being disposed beneath said storage spindle portion for supporting the record member portion subsequent to said initial portion, and driving means for extracting said record member from said spindle in order from said central portion to said external portion, said driving means being arranged for bringing said record member into circumferential contacting relation with said spindle take-up portion.

9. Flexible record transport apparatus comprising a frame member, an axle member associated with and supported by the frame member, a spindle having a storage portion and a take-up portion mounted in substantially vertical relation above said storage portion, said spindle portions mounted for independent rotation about the common axis of the axle member and having slopes of opposite sense with respect to said axis, a pan member rotatably mounted for independent concentric rotation with said spindle, said pan member being disposed beneath said storage portion for supporting the record member, and braking means associated with said pan member and being responsive to stoppages in said driving means for braking said pan member.

10. Flexible record transport apparatus comprising a frame member, an axle member associated with and supported by the frame member, a spindle having a storage portion and a take-up portion, said spindle portions being mounted for independent rotation about the common axis of the axle member, the said portions having slopes of opposite sense to said axis so as to form truncated cones of abutting minor cross-sections, and braking means operatively associated with the spindle storage portion so as to control movement of the said spindle storage portion.

References Cited in the file of this patent

UNITED STATES PATENTS

| | | |
|---|---|---|
| 1,075,487 | Merkel | Oct. 14, 1913 |
| 1,135,846 | Rickon | Apr. 13, 1915 |
| 1,393,985 | Voulgre | Oct. 18, 1921 |
| 2,686,051 | Holme-Shaw | Aug. 10, 1954 |
| 2,793,039 | Hironimus | May 21, 1957 |